United States Patent
Thijssen et al.

(10) Patent No.: US 7,643,850 B2
(45) Date of Patent: Jan. 5, 2010

(54) CELLULAR COMMUNICATION TERMINALS AND METHODS THAT SENSE TERMINAL MOVEMENT FOR CURSOR CONTROL

(75) Inventors: Jeroen Thijssen, Bara (SE); Jan Nilsson, Harlosa (SE)

(73) Assignee: Sony Ericsson Mobile Communications AB (SE)

( * ) Notice: Subject to any disclaimer, the term of this patent is extended or adjusted under 35 U.S.C. 154(b) by 737 days.

(21) Appl. No.: 11/247,789

(22) Filed: Oct. 11, 2005

(65) Prior Publication Data
US 2007/0207834 A1    Sep. 6, 2007

(51) Int. Cl.
*H04B 7/00* (2006.01)
(52) U.S. Cl. .................. 455/557; 455/115.1; 455/456.1; 455/458
(58) Field of Classification Search ............... 455/556.1, 455/557, 66.1, 115.1, 456.1, 457, 466, 458; 370/310; 345/156; 235/385, 472.02; 715/744–745, 715/747
See application file for complete search history.

(56) References Cited

U.S. PATENT DOCUMENTS

| | | | |
|---|---|---|---|
| 2003/0016419 A1* | 1/2003 | Palmer et al. | 359/154 |
| 2004/0259591 A1* | 12/2004 | Grams et al. | 455/556.1 |
| 2005/0007343 A1* | 1/2005 | Butzer | 345/163 |
| 2005/0050474 A1* | 3/2005 | Bells et al. | 715/747 |
| 2005/0212752 A1 | 9/2005 | Marvit et al. | |
| 2005/0243062 A1* | 11/2005 | Liberty | 345/158 |
| 2006/0092866 A1* | 5/2006 | Kim et al. | 370/310 |
| 2006/0208087 A1* | 9/2006 | Kressin et al. | 235/472.02 |

(Continued)

FOREIGN PATENT DOCUMENTS

EP    1 028 366 A2    8/2000

(Continued)

OTHER PUBLICATIONS

International Search Report and Written Opinion; date of mailing Mar. 19, 2007.

(Continued)

*Primary Examiner*—Dwayne Bost
*Assistant Examiner*—Inder P Mehra
(74) *Attorney, Agent, or Firm*—Myers Bigel Sibley & Sajovec, P.A.

(57) ABSTRACT

A cellular communication terminal is configured to function as a mouse for a proximately located computer. The cellular communication terminal includes a cellular transceiver, a communication interface, an accelerometer, and a controller. The cellular transceiver is configured to communicate over a wireless cellular interface with a cellular network. The communication interface is configured to be communicatively coupled to the proximately located computer. The accelerometer is configured to generate acceleration information that is indicative of movement of the terminal. The controller is configured to communicate through the cellular transceiver with the cellular network according to a cellular communication protocol, and to selectively operate in a mouse mode during which the controller generates terminal movement information based on the acceleration information from the accelerometer and communicates the terminal movement information through the communication interface to the proximately located computer. The communication interface may be a short-range wireless communication transceiver and/or a wired interface, such as a USB interface. Related terminals and methods are disclosed for using the terminal to provide mouse type functions for a user application in the terminal and/or an application on a remotely located communication device.

21 Claims, 3 Drawing Sheets

U.S. PATENT DOCUMENTS

2006/0262012 A1* 11/2006 Nishikata et al. ....... 342/357.11
2007/0015504 A1* 1/2007 Kusuda et al. ........... 455/426.2
2007/0021065 A1* 1/2007 Sengupta et al. ........... 455/41.2
2007/0132714 A1* 6/2007 Nilsson ...................... 345/156
2008/0206744 A1* 8/2008 Zacharias ...................... 435/6

FOREIGN PATENT DOCUMENTS

| EP | 1028366 A2 * | 8/2000 |
|---|---|---|
| JP | 2001-103395 A | 4/2001 |
| WO | WO 2006/036069 A1 | 4/2006 |
| WO | WO 2006/049506 A1 | 5/2006 |

OTHER PUBLICATIONS

International Search Report, PCT/EP2006/063545, Nov. 9, 2007.

* cited by examiner

CELLULAR COMMUNICATION TERMINALS AND METHODS THAT SENSE TERMINAL MOVEMENT FOR CURSOR CONTROL

FIELD OF THE INVENTION

The present invention relates to the field of digital computers in general and more particularly, to apparatus and methods for providing mouse input to a computer.

BACKGROUND OF THE INVENTION

Digital computers have evolved to include various different user interface devices that enable a user to steer a cursor around a screen to select among displayed menus and other objects and to perform various other functions. A computer mouse is one widely used type of user interface device. The mouse is usually connected by cable to the computer, but may instead be connected via a wireless interface. The mouse may use a roller ball or a light source (e.g., LED) coupled to a light sensor to sense movement of the mouse. Movement of the mouse is interpreted by the computer as, for example, a user command to move a cursor on the screen. The mouse generally includes several buttons that can be actuated by a user to, for example, signal the user's selection of a displayed menu or other object that is adjacent to the cursor.

In portable computer applications the mouse has the drawback of being separate from the computer. Accordingly, the user can be inconvenienced by the need to remember to bring along the mouse when traveling with or otherwise moving the computer, and by the need to separately pack both the computer and mouse. This inconvenience has prompted the evolution of other user interface devices that are integral to the computer, such as a touchpad disposed in the computer housing and a joystick associated with the computer keyboard.

SUMMARY OF THE INVENTION

In some embodiments of the present invention, a cellular communication terminal can be configured to function as a mouse for a proximately located computer. The cellular communication terminal includes a cellular transceiver, a communication interface, an accelerometer, and a controller. The cellular transceiver is configured to communicate over a wireless cellular interface with a cellular network. The communication interface is configured to be communicatively coupled with the proximately located computer. The accelerometer is configured to generate acceleration information that is indicative of movement of the terminal. The controller is configured to communicate through the cellular transceiver with the cellular network according to a cellular communication protocol, and to selectively operate in a mouse mode during which the controller generates terminal movement information based on the acceleration information from the accelerometer and communicates the terminal movement information through the communication interface to the proximately located computer.

In some further embodiments, the communication interface includes a short-range communication transceiver, which may include a Bluetooth transceiver that is configured to communicate over a Bluetooth wireless interface, a wireless local area network (WLAN) transceiver that is configured to communicate over a WLAN wireless interface, and/or an optical transceiver that is configured to communicate optical wireless interface via infra-red signals. The communication interface may additionally, or alternatively, include a Universal Serial Bus (USB) module.

In some further embodiments, the accelerometer may be configured to generate acceleration information that is indicative of movement of the terminal along directions that are substantially parallel to a surface on which the terminal resides and to generate acceleration information that is indicative of movement of the terminal in a direction away from and toward the surface. The controller may be configured to determine from the acceleration information when the terminal has been lifted from the surface and then placed back on the surface, and configured to stop transmitting the terminal movement information through the short-range communication transceiver when the terminal is determined to have been lifted from the surface and to resume transmitting the terminal movement information through the short-range communication transceiver when the terminal is determined to have been placed back on the surface. In some further embodiments, the accelerometer may be configured to generate acceleration information that is indicative of movement of the terminal along three orthogonal axis, and in which two of the axis form a plane that is substantially parallel to the surface on which the terminal resides and the third axis is substantially orthogonal to the surface.

In some further embodiments, the controller may be configured to respond to a scale value in the terminal to scale how fast the terminal is indicated to be moving based on the acceleration information, and to vary the scale value responsive to input from a user and/or the computer. The terminal movement information may be configured to indicate movement of the terminal along at least two axis, and the controller may be configured to reverse one or more of the at least two axis and/or to swap its response to two of the axis for one another responsive to input from a user and/or the computer.

In some further embodiments, the terminal further includes a keypad with a plurality of keys. The controller may be configured to communicate a representation of a mouse button click through the communication interface responsive to a user actuation of at least one of the keys. The controller may be further configured to vary an assignment of one or more of the keys as representing one or more mouse buttons responsive to button assignment information from a user and/or the computer. The terminal may further include a scroll wheel and the controller may be configured to communicate through the communication interface information that is indicative of movement of the scroll wheel.

In some other embodiments of the present invention, the cellular communication terminal includes a cellular transceiver, a display device, an accelerometer, and a controller. The cellular transceiver is configured to communicate over a wireless cellular interface with a cellular network. The accelerometer is configured to generate acceleration information that is indicative of movement of the terminal. The controller is configured communicate through the cellular transceiver with the cellular network according to a cellular communication protocol, and to display on the display device information and an indication of a user's selection among the displayed information. The controller is further configured to selectively operate in a mouse mode during which the controller moves the displayed indication of a user's selection responsive to the acceleration information from the accelerometer.

In some further embodiments, the displayed indication of a user's selection may be a cursor. The terminal may further include a short-range communication transceiver that is configured to communicate over a wireless interface with a proximately located device. The controller may be further configured to generate terminal movement information based on the acceleration information from the accelerometer and to transmit the terminal movement information through the short-range communication transceiver to a proximately located computer when the terminal is operating in the mouse mode. The short-range communication transceiver may include a Bluetooth transceiver that is configured to communicate over a Bluetooth wireless interface, a wireless local area network (WLAN) transceiver that is configured to communicate over a WLAN wireless interface, and/or an optical transceiver that is configured to communicate over an optical wireless interface through infra-red signals. The terminal may include a USB module, and the controller may be configured to communicate the terminal movement information through the USB module to the computer when the terminal is operating in a mouse mode.

In some further embodiments, the controller may be further configured to generate terminal movement information based on the acceleration information from the accelerometer and to transmit the terminal movement information through the cellular transceiver to the cellular network when the terminal is operating in the mouse mode.

In some further embodiments, the accelerometer may be configured to generate acceleration information that is indicative of movement of the terminal along directions that are substantially parallel to a surface on which the terminal is placed and to generate acceleration information that is indicative of movement of the terminal in a direction away from and toward the surface. The controller may be further configured to determine from the acceleration information when the terminal has been lifted from the surface and then placed back on the surface, and configured to stop moving the displayed cursor responsive to the acceleration information when the terminal is determined to have been lifted from the surface and to resume moving the displayed cursor responsive to the acceleration information when the terminal is determined to have been placed back on the surface.

In some further embodiments, the controller may be configured to respond to a scale value in the terminal to scale how fast the displayed cursor is moved responsive to the acceleration information, and to vary the scale value responsive to input from a user.

In some further embodiments, the acceleration information can be indicative of movement of the terminal along at least two axis. The controller may be further configured to respond to input from a user by reversing a direction it moves the displayed cursor when terminal movement is sensed relative to an axis and/or to swap its displayed response to terminal movement along two of the axis for one another.

In some further embodiments, the controller is configured to display on the display device a portion of information, and to change what portion of the information is displayed on the display device responsive to the acceleration information.

Some other embodiments of the present invention provide a method of using a cellular communication terminal as a computer mouse. Communication is established through a communication interface in the terminal with a proximately located computer. The cellular communication terminal is selectably operated in a mouse mode responsive to a command from a user and/or and from the proximately located computer. Acceleration information from an accelerometer that is indicative of movement of the terminal is sensed. Terminal movement information that is based on the acceleration information is selectively communicated through the communication interface to the proximately located computer when the terminal is operating in the mouse mode.

Some other embodiments of the present invention provide a method of using a cellular communication terminal. The terminal is selectively operated in a mouse mode responsive to a command from a user. Terminal acceleration information is sensed at the terminal from an accelerometer that is indicative of movement of the terminal. Information is displayed on a display device of the cellular communication terminal along with an indication of a user's selection among the displayed information. The displayed indication of a user's selection is moved in response to the acceleration information from the accelerometer when the cellular communication terminal is operating in the mouse mode.

In some further embodiments, a portion of information is displayed on the display device, and what portion of the information that is displayed on the display device is changed in response to the acceleration information.

DETAILED DESCRIPTION

Figure 1:
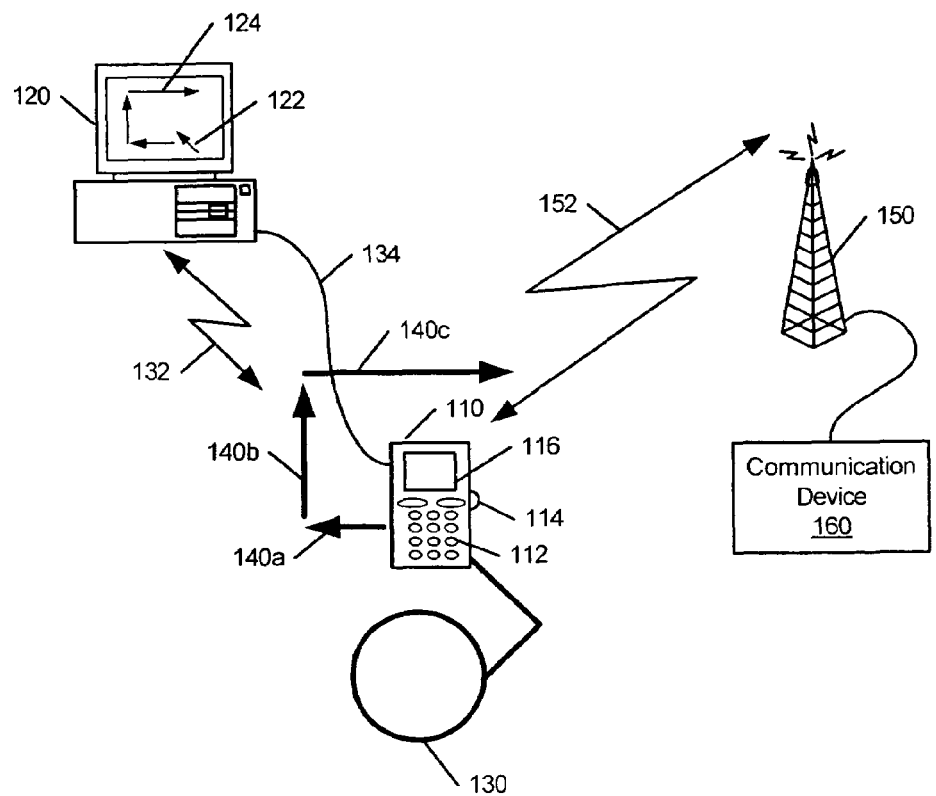
FIG. 1 is a block diagram that illustrates a cellular communication terminal that operates as a mouse for a computer over a wireless interface in accordance with some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items. The common abbreviation "e.g.", which derives from the Latin phrase "exempli gratia," may be used to introduce or specify a general example or examples of a previously mentioned item, and is not intended to be limiting of such item.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

Embodiments according to the present invention are described with reference to block diagrams and/or operational illustrations of methods, wireless communication terminals, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. Computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "cellular communication terminal" or "cellular terminal" includes, but is not limited to, a cellular data terminal and/or telephone that is configured to communicate through a wireless (air) interface with a cellular network and to communicate through another communication interface, which may include a short range wireless interface such as, for example, a Bluetooth wireless interface, a wireless local area network (WLAN) interface (e.g., IEEE 801.11a-g), and/or an optical interface via infra-red signals, and/or which may include a wired interface such as a Universal Serial Bus (USB).

FIG. 1 is a block diagram that illustrates a cellular terminal 110 that is configured to provide user interface functionality of a mouse for a proximately located computer 120. For example, a user 130 may move the cellular terminal 110 along the exemplary path 140a-c. The cellular terminal 110 senses its movement based on acceleration information (e.g., from accelerometers) and communicates an indication of that movement over a communication interface that includes a short-range communication interface 132 and/or a wired interface 134 to the computer 120. The short-range communication interface 132 may be, but is not limited to, a Bluetooth wireless interface, a WLAN interface, and/or an optical interface.

The computer 120 may respond to the received indicated movement of the cellular terminal 110 by, for example, moving a cursor 122 that is displayed on a display device of the computer 120 along a similar path 124. Accordingly, the user 130 may move the cellular terminal 110 along a tabletop to guide the cursor 122 on the display relative to information displayed by the computer 120. The user 130 may select among information displayed by the computer 120 adjacent to the cursor 122 by actuating one or more buttons 112 and/or a scroll wheel 116 of the cellular terminal 110. The cellular terminal 110 may further include a display device 116 on which it may display an indication of its sensed movement.

The cellular terminal 110 can be configured to communicate over a wireless cellular interface 152 with a cellular network 150. Accordingly, the cellular terminal 110 can be configured to selectively operate as a conventional cellular telephone or data terminal in cellular mode, and to operate as a mouse for the computer 120 in a mouse mode. The computer 120 may be, but is not limited to, a stationary personal computer (PC), a mobile PC such as laptop or palmtop PC, a personal data assistant (PDA), or any other computing device that is configured to respond to movement of another device as an indication of an input command from a user.

Figure 2:
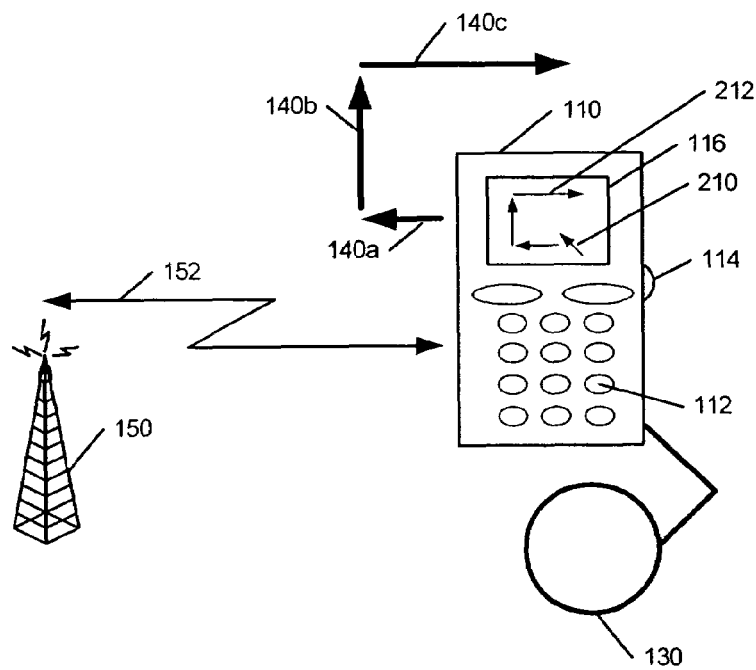
FIG. 2 is a block diagram that illustrates a cellular communication terminal that operates as a mouse for itself in accordance with some embodiments of the present invention.

With reference not to FIG. 2, in some other embodiments, the cellular terminal 110 may be configured to use its sensed movement as an indication of user input for one or more user applications that are resident in the cellular terminal 110 and/or applications that are resident within the cellular network 150 or resident in another device that is communicatively coupled to the cellular terminal 110 through the cellular network 150. The cellular terminal 110 may sense its movement along path 140a-c and respond to that movement as an indication of commands from a user.

For example, a user application that is resident on the cellular terminal 110 may display a cursor 210 on the display device 116 and may move the cursor 210 along a corresponding path on the display device 116 responsive to the sensed movement. The user 130 may select among information that is displayed on the display device 116 by actuating the buttons 112 and/or the scroll wheel 114. As a further example, the user 130 may move the cellular terminal 110 to steer the cursor 210 over an item in a displayed menu. The user 130 may click one of the buttons 112 to select the item and cause the user application to display a list of selectable sub-items. The user 130 may then use the scroll wheel 114 to scroll through and select among the sub-items.

The cellular network 150 can include conventional base station transceivers, mobile switching centers, and associated network infrastructure that enables communication between the terminal 110 and a remotely located communication device 160 that is coupled to the cellular network 150 through, for example, a public switched telephone network (PSTN), Internet, and/or via a cellular interface with the same or another cellular network. The cellular terminal 110 may communicate an indication of its sensed movement through the cellular interface 152 to one or more applications that are resident on the remotely located communication device 160. Such applications may respond to the communicated movement of the cellular terminal 110 as commands from the user 130, and may communicate back to the cellular terminal 110 one or more commands and/or data that causes a change in the displayed information and/or causes a change in operation of the cellular terminal 110. For example, the user may move the cellular terminal 110 to directly/indirectly cause an application in the communication device 160 to download/upload data, such as a text, music, video, and/or program operations (e.g., for game operation), through the cellular network 150 to/from the cellular terminal 110.

Figure 3:
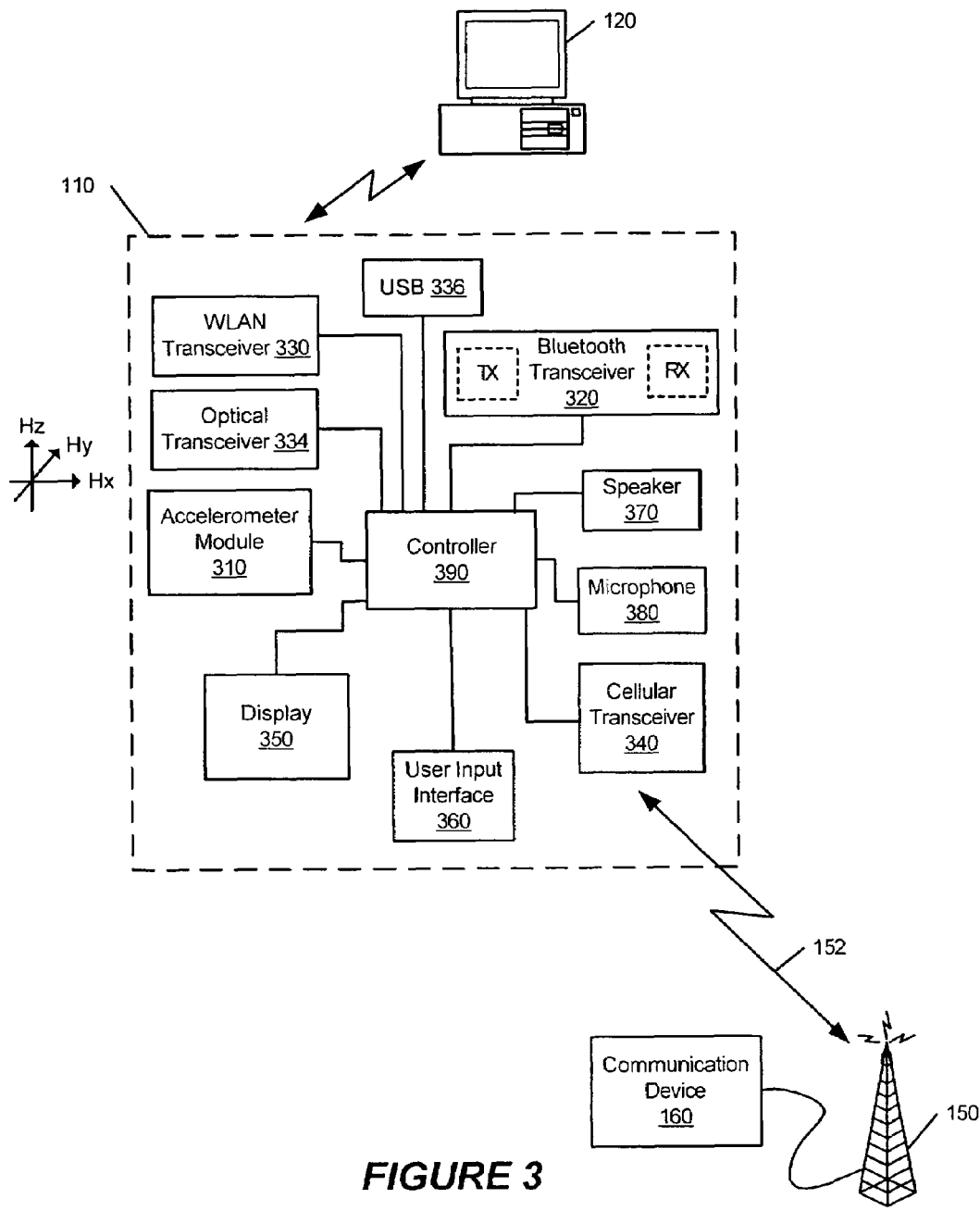
FIG. 3 is a block diagram that illustrates the cellular communication terminal of FIGS. 1 and 2 in accordance with some embodiments of the invention.

FIG. 3 is a schematic block diagram that illustrates in further detail the cellular terminal 110 configured in accordance with some embodiments of the present invention. The terminal 110 can include an accelerometer module 310, a Bluetooth transceiver 320, a WLAN transceiver 330, an optical transceiver 334, a USB module 336, a cellular transceiver 340, a display 350, a user input interface 360, a speaker 370, and a microphone 380 which are communicatively connected to a controller 390. Although the controller 390 has been illustrated as a single functional block to simply the drawing, it is to be understood the function and operations described herein for the controller 390 may be distributed among a plurality a devices (e.g., a digital signal processor, general purpose processor, gate array, . . . ). The Bluetooth transceiver 320, WLAN transceiver 330, and optical transceiver 334 are configured to communicate through a short-range wireless communication interface with the proximately located computer 120. The WLAN transceiver 330 may be compliant with, for example, IEEE 802.11a-g. Communication between the terminal 110 and the computer 120 through the transceivers 320, 330, 334, may be direct without intervening devices or it may be indirect such as through a WLAN router that routes communications therebetween. The optical transceiver 334 may be configured to communicate via infra-red signals. The USB module 336 is configured to be communicatively coupled to a USB module in the computer 120.

The terminal 110 may thereby communicate with the computer 120 over short ranges, which may be, but are not limited to, less than about several hundred meters for communication through the WLAN transceiver 330, less than about a 100 meters for the Bluetooth transceiver 320, and less than about 10 meters for the optical transceiver 334. The Bluetooth transceiver 320, WLAN transceiver 330, and optical transceiver 334 each typically include both a transmitter (TX) and a receiver (RX) (illustrated within the transceiver 320) to allow bi-directional communications, but the present invention is not limited to such transceivers and, as used herein, a "transceiver" may include only a transmitter. Although the terminal 110 is illustrated as having Bluetooth, WLAN, and optical transceivers 320, 330, 334, it may instead include less and/or other types of transceivers.

The controller 390 in combination with the cellular transceiver 340 is configured to communicate over the cellular interface 152 with the cellular network 150 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). Communication protocols as used herein may specify the information communicated, the timing, the frequency, the modulation, and/or the operations for setting-up and/or maintaining a communication connection.

The accelerometer module 310 is configured to generate acceleration information that is indicative of movement of the terminal 110. The accelerometer module 310 may include, for example, a solid-state acceleration sensor, such as a semiconductor acceleration sensor, and/or it may include a gyro, such as a rotating gyro and/or a ring laser gyro. The controller 390 is configured to selectively operate in a mouse mode during which it generates terminal movement information based on the acceleration information from the accelerometer module 310 and may transmit the terminal movement information through the Bluetooth transceiver 320, the WLAN transceiver 330, and/or the optical transceiver 334 and/or through the USB module 336 to the computer 120. The computer 120, the terminal 110, and/or the remotely located communication device 160 can include one or more applications that respond to the received terminal movement information as an indication of commands from a user, such as was described above with regard to FIGS. 1 and 2.

The accelerometer module 310 can be configured to generate acceleration information that is indicative of movement of the terminal 110 along directions that are substantially parallel to a surface on which the terminal 110 resides and to generate acceleration information that is indicative of movement of the terminal 110 in a direction away from and toward the surface. For example, the acceleration information may be indicative of movement of the terminal 110 along three orthogonal axis Hx, Hy, Hz. Two of the axis (e.g., Hx and Hy) may form a plane that is substantially parallel to the surface on which the terminal 110 resides and the third axis (e.g., Hz) may be substantially orthogonal to the surface.

The controller 390 may be configured to reverse the direction of one of more of the axis and/or to swap two or more of the axis for one another. Accordingly, the indicated direction of movement of the terminal 100 along an axis may be reversed and/or it may be changed by mapping the movement to different directional axis. The controller 390 may be configured to display on the display device 350 a portion of information, and to change what portion of the information is displayed on the display device 350 responsive to the acceleration information from the accelerometer module 310. For example, the controller 390 may display a portion of a spreadsheet on the display device 350, and may scroll across the spreadsheet to display various different parts of the spreadsheet and/or to zoom in/out on portions of the spreadsheet in response to a user moving the terminal 110.

The controller 390 may be configured to determine from the acceleration information when the terminal 110 has been lifted from the surface on which it resides and then placed back on the surface. The controller 390 can also be configured to stop transmitting the terminal movement information to the computer 120 and/or the communication device 160 when the terminal 110 is determined to have been lifted from the surface and to resume transmitting the terminal movement information when the terminal 110 is determined to have been placed back on the surface. When the controller 390 includes a user application that responds to the terminal movement information, it may selectively provide the terminal movement information to the user application responsive to the determination of when the terminal 110 has been lifted from the surface. Accordingly, for example, when a user desires to signal terminal movement that would extend beyond an edge of a table on which the terminal 110 resides, the user may pick-up the terminal 110 and move it further from the table edge and then resume moving the terminal 110 in the desired direction. Accordingly, the controller 110 may be configured to not report terminal movement to a target application on the computer 120, terminal 110, and/or remote device 160 while the terminal 110 is lifted away from the table edge.

The controller 390 may be further configured to vary, based on a scale value, how fast the terminal 110 is indicated to be moving based on the acceleration information. For example, the controller 390 may scale the acceleration information based on the scale value to generate the terminal movement information transmitted to the computer 120 and/or the remote device 160, and/or that is used by a user application in the terminal 110. The scale value may be varied by a user of the terminal 110 and/or under control of another device such as the computer 120 and/or remote device 160.

The controller 390 may generate an indication of a user click of one or more buttons on a conventional mouse, such an indication of a user click of a right/left mouse button. The assignment of which of the keys 112 represents which mouse buttons may be, for example, reconfigurable in software responsive to a command from a user of the terminal 110, from the computer 120, and/or from the communication device 160. The controller 390 may monitor the acceleration information to identify occurrence of an abrupt movement of the terminal 110 (e.g., sharp pulse in the acceleration information), such as from a user tapping the terminal 110 on a hard surface. In response to identifying an abrupt movement of the terminal 110, the controller 390 may generate to the computer 120 an indication of a user selection of a defined button or other defined user input.

Figure 4:
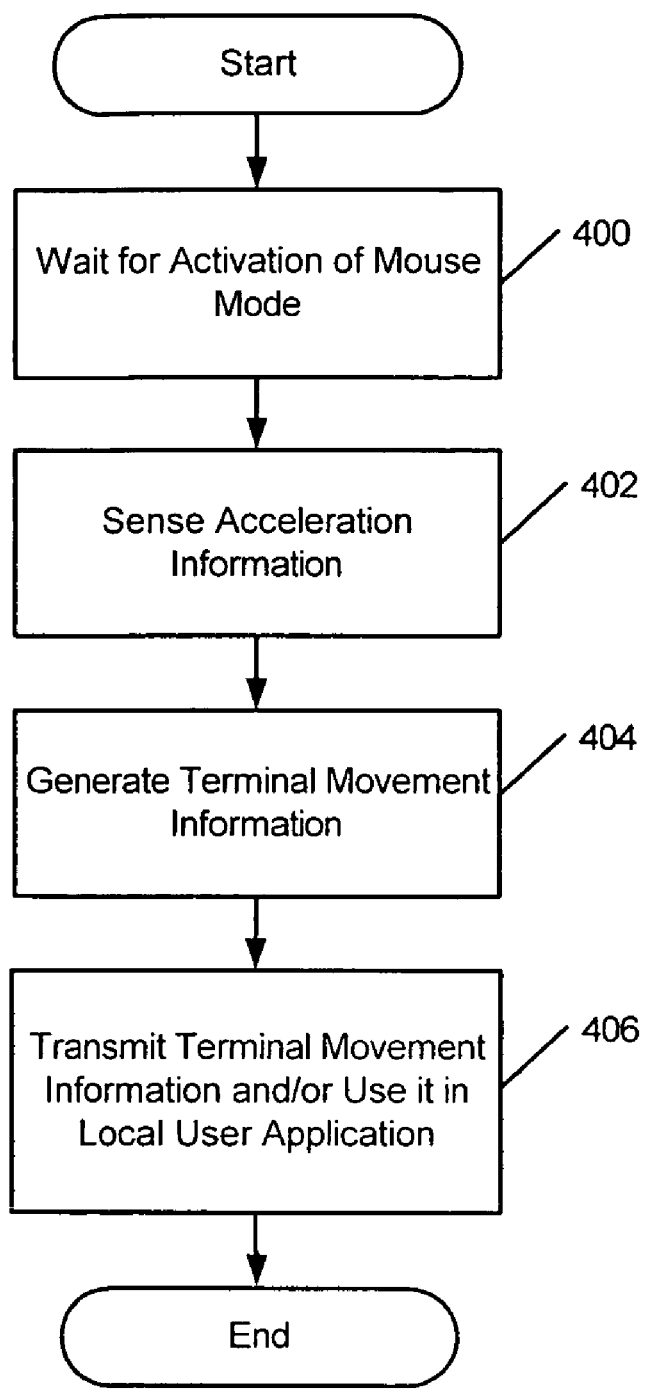
FIG. 4 is a flowchart that illustrates operations configured to operate a cellular communication terminal as a computer mouse.

FIG. 4 is a flowchart that illustrates operations configured to operate a cellular communication terminal as a computer mouse. Activation of a mouse mode is awaited at Block 400. The mouse mode may be activated by a user of the terminal 110 and/or by a command received from another device, such as the computer 120 and/or the communication device 160. Acceleration information from the accelerometer module 310 that indicates movement of the terminal 110 is sensed at Block 402. Terminal movement information is generated at Block 404 based on the acceleration information. As explained above, the acceleration information may be scaled in a variable manner when generating the terminal movement information to vary the relationship between the actual speed/distance moved by the terminal 110 and the speed/distance that is indicated by the terminal movement information. The indicated direction of movement indicated by the terminal movement information may be varied as described above by reversing/swapping the axis corresponding to the acceleration information. At block 406, the terminal movement information is transmitted and/or used in a user application that is local to the terminal 110.

As will be appreciated, the order of the operations illustrated by Blocks 402-406 may be varied. For example, the operations of Blocks 402 and/or 404 may be carried out continuously irrespective of whether the mouse mode is active (e.g., Blocks 402 and 404 may be carried out before Block 400.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A cellular communication terminal comprising:
   a cellular transceiver that is configured to communicate over a wireless cellular interface with a cellular network;
   a communication interface that is configured to be communicatively coupled to a proximately located computer;
   an accelerometer that is configured to generate acceleration information that is indicative of movement of the terminal, the accelerometer is configured to generate acceleration information that is indicative of movement of the terminal along directions that are substantially parallel to a surface on which the terminal resides and to generate acceleration information that is indicative of movement of the terminal in a direction away from and toward the surface; and
   a controller that is configured to communicate through the cellular transceiver with the cellular network according to a cellular communication protocol, and to selectively operate in a mouse mode during which the controller generates terminal movement information based on the acceleration information from the accelerometer and communicates the acceleration information through the communication interface to the proximately located computer, and the controller is configured to determine from the acceleration information when the terminal has been lifted from the surface and then placed back on the surface, and configured to stop communicating the terminal movement information through the communication interface when the terminal is determined to have been lifted from the surface and to resume communicating the terminal movement information through the communication interface when the terminal is determined to have been placed back on the surface.

2. The cellular communication terminal of claim 1, wherein:
   the communication interface comprises a short-range communication transceiver that is configured to communicate over a wireless interface with the proximately located computer; and
   the controller is configured to transmit the terminal movement information through the short-range communication transceiver to the proximately located computer.

3. The cellular communication terminal of claim 2, wherein the short-range communication transceiver comprises a Bluetooth transceiver that is configured to communicate over a Bluetooth wireless interface.

4. The cellular communication terminal of claim 2, wherein the short-range communication transceiver comprises a wireless local area network (WLAN) transceiver that is configured to communicate over a WLAN wireless interface.

5. The cellular communication terminal of claim 2, wherein the short-range communication transceiver comprises an optical transceiver that is configured to communicate optical wireless interface via infra-red signals.

6. The cellular communication terminal of claim 1, wherein:
   the communication interface comprises a Universal Serial Bus (USB) module; and
   the controller is configured to communicate the terminal movement information through the USB module to the proximately located computer.

7. The cellular communication terminal of claim 1, wherein the accelerometer is configured to generate acceleration information that is indicative of movement of the terminal along three orthogonal axis, wherein two of the axis form a plane that is substantially parallel to the surface on which the terminal resides and the third axis is substantially orthogonal to the surface.

8. The cellular communication terminal of claim 1, wherein the controller is configured to respond to a scale value in the terminal to scale how fast the terminal is indicated to be moving based on the acceleration information, and to vary the scale value responsive to input from a user and/or the computer.

9. The cellular communication terminal of claim 1, wherein the terminal movement information indicates movement of the terminal along at least two axis, and the controller is configured to reverse one or more of the at least two axis and/or to swap its displayed response to terminal movement along two of the axis for one another responsive to input from a user and/or the computer.

10. The cellular communication terminal of claim 1, further comprising a keypad with a plurality of keys, wherein the controller is configured to communicate a representation of a mouse button click through the communication interface responsive to a user actuation of at least one of the keys.

11. The cellular communication terminal of claim 10, wherein the controller is configured to vary an assignment of one or more of the keys as representing one or more mouse buttons responsive to button assignment information from a user and/or the computer.

12. The cellular communication terminal of claim 1, further comprising a scroll wheel, wherein the controller is configured to communicate through the communication interface information that is indicative of movement of the scroll wheel.

13. A cellular communication terminal comprising:
   a cellular transceiver that is configured to communicate over a wireless cellular interface with a cellular network;
   a display device;

an accelerometer that is configured to generate acceleration information that is indicative of movement of the terminal, wherein the accelerometer is configured to generate acceleration information that is indicative of movement of the terminal along directions that are substantially parallel to a surface on which the terminal is placed and to generate acceleration information that is indicative of movement of the terminal in a direction away from and toward the surface; and a controller that is configured to communicate through the cellular transceiver with the cellular network according to a cellular communication protocol, and to display on the display device information an indicative of a user's selection among the displayed information, and configured to selectively operate in a mouse mode during which the controller moves the displayed indication responsive to the acceleration information from the accelerometer, the controller is configured to determine from the acceleration information when the terminal has been lifted from the surface and then placed back on the surface, and configured to stop moving the displayed indication of a user's selection among displayed information responsive to the acceleration information when the terminal is determined to have been lifted from the surface and to resume moving the displayed indication responsive to the acceleration information when the terminal is determined to have been placed back on the surface.

14. The cellular communication terminal of claim 13, further comprising a short-range communication transceiver that is configured to communicate over a wireless interface with a proximately located device, and the controller is further configured to generate terminal movement information based on the acceleration information from the accelerometer and to transmit the terminal movement information through the short-range communication transceiver to a proximately located computer when the terminal is operating in the mouse mode.

15. The cellular communication terminal of claim 14, wherein the short-range communication transceiver comprises a Bluetooth transceiver that is configured to communicate over a Bluetooth wireless interface.

16. The cellular communication terminal of claim 14, wherein the short-range communication transceiver comprises a wireless local area network (WLAN) transceiver that is configured to communicate over a WLAN wireless interface and/or an optical transceiver that is configured to communicate over an optical wireless interface through infra-red signals.

17. The cellular communication terminal of claim 13, further comprising a Universal Serial Bus (USB) module, and wherein the controller is further configured to generate terminal movement information based on the acceleration information from the accelerometer and to communicate the terminal movement information through the USB module to a proximately located computer when the terminal is operating in the mouse mode.

18. The cellular communication terminal of claim 13, wherein the controller is configured to generate terminal movement information based on the acceleration information from the accelerometer and to transmit the terminal movement information through the cellular transceiver to the cellular network when the terminal is operating in the mouse mode.

19. The cellular communication terminal of claim 13, wherein the controller is configured to respond to a scale value in the terminal to scale how fast the displayed indication is moved responsive to the acceleration information, and to vary the scale value responsive to input from a user.

20. The cellular communication terminal of claim 13, wherein the acceleration information is indicative of movement of the terminal along at least two axis, and responsive to input from a user the controller is configured to reverse a direction it moves the displayed indication when terminal movement is sensed relative to the at least two axis and/or to swap its response to terminal movement along two of the axis for one another.

21. The cellular communication terminal of claim 13, wherein the controller is configured to display on the display device a portion of information, and to change what portion of the information is displayed on the display device responsive to the acceleration information.

* * * * *

UNITED STATES PATENT AND TRADEMARK OFFICE
CERTIFICATE OF CORRECTION

PATENT NO. : 7,643,850 B2 Page 1 of 1
APPLICATION NO. : 11/247789
DATED : January 5, 2010
INVENTOR(S) : Thijssen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1121 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,643,850 B2  
APPLICATION NO. : 11/247789  
DATED : January 5, 2010  
INVENTOR(S) : Thijssen et al.

Page 1 of 1

It is certified that error appears in the above-identified patent and that said Letters Patent is hereby corrected as shown below:

On Title Page:
Item (45) Date of Patent: Please correct "Jan.5, 2010" to read -- *Jan. 5, 2010 --

Item (*): Please correct by adding the following language:
-- This patent is subject to a terminal disclaimer. --

Signed and Sealed this
Twentieth Day of September, 2011

David J. Kappos
*Director of the United States Patent and Trademark Office*